3,028,406
PREPARATION OF ORGANO-TRANSITION ELEMENT COMPOUNDS

John C. Brantley, Amherst, N.Y., assignor to Union Carbide Corporation, a corporation of New York
No Drawing. Filed July 25, 1955, Ser. No. 524,268
2 Claims. (Cl. 260—439)

This invention relates to a process for the production of organo-metallic compounds which contain a transition element as the metal component.

It is an object of the present invention to provide a novel and improved process for producing organo-metallic compounds containing a transition element as the metal component and a specific object is the provision of a novel and improved process for production of bis(cyclopentadienyl)iron.

Another object of the invention is to provide organo-alkaline earth metal compounds and a novel process for their production.

Other objects of the invention will in part be obvious and will in part appear hereinafter.

The present invention provides an effective and economical method for the production of organo-transition element compounds, of which bis(cyclopentadienyl)iron is a specific example. In the process of this invention an organic compound containing a five carbon ring alicyclic in character, comprising a methylene group ($CH_2$) or a substituted methylene group containing an acidic replaceable hydrogen and where the methylene carbon atom is linked by single bonds to each of two carbon atoms which in turn are linked by double bonds to each of two other carbon atoms which are linked together by a single bond, is first converted into its alkaline-earth metal derivative wherein the alkaline-earth metal substituent replaces hydrogen on the methylene carbon atom. Then, the organo-alkaline-earth metal compound thus formed is reacted with a halide of a transition element, which term will be understood to include oxy halides of transition elements, to form compounds which may be represented as having the general empirical formula:

$$R_2MX_z$$

wherein R represents a residue of an organic compound, preferably a hydrocarbon residue of an organic compound, of the type referred to above, M is a transition element, X is halogen and z may be 0, 1, 2 or 3.

The above described five carbon ring, alicyclic in character and containing an acidic replaceable hydrogen, has the following structure, hereinafter designated "alicyclic cyclopentadienyl ring structure":

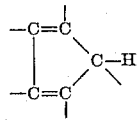

The alicyclic character of the ring structure is essential for purposes of this invention. For example, both cyclopentadiene and indene contain an alicyclic cyclopentadienyl ring structure; cyclopentadiene having no double bond coordinately shared with an aromatic ring and indene having only one double bond of the cyclopentadienyl ring coordinately shared with an aromatic ring. In contrast, the five carbon ring in fluorene, where each of the double bonds in such ring is coordinately shared with an aromatic ring, is not alicyclic in character and fluorene thus does not contain an alicyclic cyclopentadienyl ring structure.

Apart from the requirement that the ring be alicyclic and contain on the methylene carbon atom an acidic replaceable hydrogen, the type and character of substituents attached on the bonds indicated at open valence bonds in the above formula are widely variable. However, particularly suitable as organic compounds which may be employed according to and for purposes of this invention are cyclopentadiene, and hydrocarbon substituted (hydrocarbyl)cyclopentadienes such as aliphatic and polyaliphatic derivatives as for example methyl, ethyl, butyl, allyl and vinyl cyclopentadienes, and alicyclic aromatic and polyaromatic derivatives as for example phenyl and benzyl cyclopentadiene, and indene and its comparable derivatives.

It will be noted that in the empirical formula $R_2MX_z$, given above, R is a radical of an organic compound containing an alicyclic cyclopentadienyl ring structure, the radical containing the same ring structure as the compound less one replaceable hydrogen on the methylene carbon atom.

Reference herein to "transition elements" means those elements of the periodic system characterized by atoms in which an inner $d$ level of electrons is present but not filled to capacity, namely, Sc, Ti, V, Cr, Mn, Fe, Co, Ni, Y, Zr, Nb, Mo, Tc, Ru, Rh, Pd, La, Hf, Ta, W, Re, Os, Ir, Pt, and Ac as well as the so-called inner transition elements comprising the rare earth or lanthanide and the actinide series.

The invention may desirably be applied to production of organo-metallic compounds of the type described in which M in the above empirical formula is a transition element of the fourth period, viz., those elements having an atomic number 21–28 inclusive, namely, Sc, Ti, V, Cr, Mn, Fe, Co, and Ni. This group of the transition elements is characterized by having an inner $3d$ level which is partially occupied but is not filled to capacity. Consequently, this group of the transition elements may be designated the $3d$ orbital series of transition elements. The process of the present invention is particularly adapted to production of organo-metallic compounds of the type described in which M is iron.

The process of the present invention involves two phases. The first phase comprises formation of an alkaline-earth metal derivative of an organic compound containing a cyclopentadienyl ring structure as defined above and the second phase comprises reaction of this alkaline-earth metal derivative with a halide of a transition element. Both reactions are essentially reactions in solution, wherein the employment of suitable solvents greatly facilitates the conduct of the desired reaction in each of the phases. The halogens, chlorine, bromine and iodine are preferred as the halogen portion of the transition element halide.

In the first phase, the organic compound having the alicyclic cyclopentadienyl ring structure is reacted in a suitable solvent with an alkaline-earth metal carbide. The resulting first stage product is an organo-alkaline earth metal which is represented by the empirical formula:

$$R_2A$$

where A represents an alkaline earth metal and R is a residue of an organic compound containing an alicyclic cyclopentadienyl ring. The specific reaction employing cyclopentadiene and calcium carbide may be taken as illustrating the first phase reaction, designating cyclopentadiene as $C_4H_4$—$CH_2$. In this instance the reaction is:

$$2C_4H_4\text{—}CH_2 + CaC_2 \rightarrow (C_4H_4\text{—}CH)_2Ca + C_2H_2$$

A number of solvents may be employed for the reactants in formation of the alkaline-earth metal derivative of the organic compound having an alicyclic cyclopentadienyl ring structure. The reaction of alkaline-earth metal carbide with the organic compound proceeds readily in liquid ammonia to give satisfactory yields of the alkaline-earth metal derivative. Ethers such as diethyl ether and methyl phenyl ether, alkylene glycol ethers such as ethylene glycol methyl phenyl ether and propylene glycol dimethyl ether and acetals such as diethyl acetal and dibutyl acetal may also be employed. Glycol lower dialkyl ethers such as dimethyl, diethyl, dibutyl and dipropyl ethers of alkylene and polyalkylene glycols may be suitably employed.

The desired reactions in formation of the organo-alkaline-earth metal compounds take place within a wide ratio of reactants, and the temperature may be varied, although temperatures at which there is substantial polymerization of the organic compound are not desirable and, at extremely low temperatures, the rate of reaction is, of course, relatively slow. In general, temperatures between about $-30°$ C. and $+35°$ C. or higher may be employed.

Several types of reactions may take place in the second phase. A general type of such reactions may be shown in general terms by the following reactions where A is an alkaline-earth metal, $AR_2$ is an alkaline-earth metal derivative of an organic compound containing an alicyclic cyclopentadienyl ring structure, M is a transition element and X is halide. Under conditions in which no reduction occurs the reactions may be represented as:

$$AR_2 + MX_2 = R_2M + AX_2$$
$$AR_2 + MX_3 = R_2MX + AX_2$$
$$AR_2 + MX_4 = R_2MX_2 + AX_2$$

However, under reducing conditions the products may be in a lower state of oxidation:

$$3AR_2 + 2MX_3 = 2R_2M + 3AX_2 + \text{organic products}$$
$$3AR_2 + 2MX_4 = 2R_2MX + 3AX_2 + \text{organic products}$$

The glycol dialkyl ethers, and preferably the glycol lower dialkyl ethers, are peculiarly well adapted for employment in the second phase of production of organo-metallic compounds according to the present invention.

The temperature at which the reaction of the organo-alkaline-earth compound with the transition element halide is conducted may be varied without departing from the invention. In general, temperatures between about $-30°$ C. and $100°$ C. are satisfactory. The temperature at which the reaction is carried out may affect the character of the desired product. Generally speaking, higher reaction temperatures tend to increase the effect of reducing conditions, e.g., an excess of the organo-alkaline-earth metal reactant while lower temperatures tend to favor formation of halogenated compounds.

The reaction between the organo-alkaline-earth compound and the transition element halide is exothermic and the temperature of reaction should be controlled within the desired limits. Desired temperature control and prevention of local overheating may be obtained by using external cooling, or by controlling the addition of reagents, or by a combination of both means. To achieve a desirable reaction rate and to maintain satisfactory temperature control, it is preferred to conduct the reaction at a temperature of between about $20°$ C. and $35°$ C. In the latter stages of the reaction when the manifestations of the exothermic nature of the reaction are not so pronounced, the temperature may be carried considerably higher, as for example up to the reflux temperature of the solvent to bring the reaction to substantial completion.

The reaction mixture containing the organo-metallic compound may be purified in a number of ways. It may be purified by concentrating the reaction solution in vacuo to a concentration allowing crystallization of the desired product, or to dryness. In the latter case the dry residue containing the desired product may be further purified by sublimation under high vacuum and recovery of the sublimed product in crystalline form. The desired organo-metallic compound may also be purified by recrystallization from solvents, for example, from saturated hydrocarbons, ethers, alcohols, chloroform, acetone, petroleum ether, benzene, toluene, water and dilute aqueous solutions of mineral acids, as well as from various mixtures of these solvents. Purification may also be accomplished by solvent partition or by distillation or steam distillation as well as by other purification methods. The organo-metallic compound may also be purified and recovered by adding water to a solution of the compound in an organic solvent in which water is soluble, whereby the product is "salted out."

In some instances it may be desirable to hydrolyze the reaction product either prior to or during the course of purification. Such hydrolysis may facilitate subsequent purification and eliminate unreacted alkaline-earth metal derivative of the organic compound. However in some instances hydrolysis may be undesirable.

As an illustration of an embodiment of a manner in which the invention may be practiced, the following example is presented.

*Example*

A commercial grade of calcium carbide was pulverized under an atmosphere of nitrogen. 16.0 g. of powder was added to a 500 ml. three-necked flask, and 225 ml. of liquid ammonia was condensed into it. Then 47.1 ml. of cyclopentadiene was added dropwise causing a pink solid to collect on the walls of the flask. After stirring one hour, 200 ml. of ethylene glycol dimethyl ether was added, and the flask was warmed to room temperature to remove the ammonia. The resulting mixture was cooled with an ice bath and 27 g. anhydrous ferric chloride was added as a solid. A red reaction mixture resulted. The reaction mixture was carefully hydrolyzed using first ethanol and finally dilute aqueous hydrochloric acid. The hydrolysis mixture was extracted with benzene to give a yellow organic layer. The benzene was then evaporated from the extract leaving a brown solid, bis(cyclopentadienyl)iron, which was then recrystallized from petroleum ether. The amount of bis(cyclopentadienyl)iron recovered was 11.8 percent based on the amount calcium carbide employed.

The reaction of the alkaline earth metal carbide with the alicyclic cyclopentadienyl compound is greatly facilitated by the former being in finely pulverized condition. Various means of reducing the particle size of the metal carbide may be used but attrition milling as, for example, ball-milling is particularly applicable.

Since certain changes in carrying out the above process and certain modifications in the composition which embody the invention may be made without departing from its scope, it is intended that all matter contained in the above description shall be interpreted as illustrative and not in a limiting sense.

Having described my invention, what I claim as new and desire to secure by Letters Patent is:

1. A process for the production of bis(cyclopentadienyl)iron which comprises reacting ferric chloride with cyclopentadienyl calcium.

2. A process for the preparation of bis(cyclopentadienyl)iron which comprises reacting cyclopentadienyl calcium having the formula $(C_5H_5)_2Ca$ with an iron chloride.

References Cited in the file of this patent

UNITED STATES PATENTS

| | | |
|---|---|---|
| 2,027,000 | Scott | Jan. 7, 1936 |
| 2,454,082 | Morton | Nov. 16, 1948 |
| 2,680,756 | Pauson | June 8, 1954 |

(Other references on following page)

UNITED STATES PATENTS

| | | |
|---|---|---|
| 2,680,758 | Thomas | June 8, 1954 |
| 2,777,887 | Weinmayr | Jan. 15, 1957 |
| 2,818,416 | Brown et al. | Dec. 31, 1957 |
| 2,834,796 | Barusch et al. | May 13, 1958 |

FOREIGN PATENTS

| | | |
|---|---|---|
| 1,097,071 | France | June 29, 1955 |

OTHER REFERENCES

Gilman: Organic Chemistry, vol. I, second ed. (1943), pp. 545 and 546.

King et al.: The Fundamentals of College Chemistry, 2nd ed. (1954), pp. 397 and 405.

Angewandte Chemie, vol. 66, page 209, April 7, 1954.